Patented Oct. 23, 1945

2,387,502

UNITED STATES PATENT OFFICE 2,387,502

THERMOPLASTIC COMPOSITIONS

Paul M. Downey, Nitro, W. Va., assignor to Monsanto Chemical Company, St. Louis, Mo., a corporation No Drawing. Application January 8, 1942, Serial No. 426,069

13 Claims. (Cl. 260—5)

This invention relates to new thermoplastic compositions. More particularly, this invention relates to admixtures of thermoplastic materials possessing improved properties.

In accordance with this invention it has been found that admixture of a butadiene compound polymer type synthetic rubber and a rubber-like-oil resistant product obtained by treating a rubber with an aryl phosphine halide results in a thermoplastic composition of superior properties and one possessing characteristics unattainable with either ingredient separately. Butadiene 1,3 and related compounds form the primary building structure for a number of synthetic rubbers and it is with these polymers and co-polymers of butadiene compounds that the present invention is concerned. Some of the more important members of this class which are available commercially include the neoprenes which are polymers of chlor butadiene, Hycar and Perbunan which are co-polymers of butadiene and acrylic nitrile and Buna S, a co-polymer of butadiene and styrene. However, any rubber like polymer or co-polymer of a butadiene compound can be used. By "rubber-like" is meant a plastic material which possesses appreciable extensibility under load coupled with the property of forcibly retracting to approximately its original size and shape after the load is removed. The individual plastic components as well as the final admixtures possess this property although usually to a different degree.

Rubber-like oil resistant plastics obtained by treating a rubber with an aryl dichlor phosphine, usually in the presence of an aromatic polynuclear hydrocarbon are disclosed in co-pending applications of George D. Martin, Serial Nos. 416,587 and 416,588 filed October 25, 1941, and in co-pending application of David J. Beaver, Serial No. 417,577, filed November 1, 1941. The methods of preparation are fully described in these disclosures and comprise, in general, bringing a rubber, usually in the presence of anhydrous aluminum chloride, into intimate association with an aryl phosphine halide as for example, tolyl dichlor phosphine, 1,3,4 trimethyl phenyl dichlor phosphine, xylyl dichlor phosphine, biphenyl dichlor phosphine, alpha naphthyl dichlor phosphine, tetrahydronaphthyl dichlor phosphine, dichlor phosphine of meta diphenyl benzene, chlor phenyl dichlor phosphine, cymyl dichlor phosphine and retyl dichlor phosphine. Particularly in the case of products derived from mononuclear aryl phosphine halides, better resistance to oils and superior physical properties result from conducting the treatment of the rubber with the phosphine halide in the presence of an aromatic polynuclear hydrocarbon such as phenanthrene, retene or retene oil. Accordingly, it is preferred to employ the polymer or copolymer of a butadiene compound in admixture with a rubber-like oil resistant plastic material obtained by treating a rubber with an aryl dichlor phosphine and retene or retene oil. It is understood, however, that any vulcanizable elastic thermoplastic product derived from a rubber and aryl phosphine halide which, in addition to possessing rubber-like properties, possess markedly greater resistance to swelling by oils than natural rubber, can be used and improved compositions obtained.

The following are examples of suitable rubber-like oil resistant thermoplastic products: The product obtained by treating pale crepe rubber with either naphthyl dichlor phosphine, tolyl dichlor phosphine or retyl dichlor phosphine, the product obtained by treating ground truck peels with retyl dichlor phosphine, the product obtained by treating pale crepe rubber with cymyl dichlor phosphine and retene, the product obtained by treating pale crepe rubber with tolyl dibrom phosphine and retene, the product obtained by treating reclaimed rubber with tolyl dichlor phosphine and retene, the product obtained by treating ground truck peels with xylyl dichlor phosphine and retene, the product obtained by treating ground truck peels with tolyl dichlor phosphine and retene oil and the product obtained by treating a co-polymer of butadiene and acrylic nitrile with tolyl dichlor phosphine and retene.

Given below are details of the preparation of typical members of this group. While these illustrate how rubber-like oil resistant products are obtained from rubbers and aryl phosphine halides, the present invention is not concerned with the preparation of the components of the new compositions and is not limited thereto.

A rubber cement was prepared by dissolving 100 parts by weight of pale crepe rubber in a suitable solvent as for example carbon disulfide. Into the cement so prepared contained in a suitable vessel fitted with a reflux condenser and stirring mechanism there was stirred 200 parts by weight of crude naphthyl phosphine dichloride. Heat was then applied and the mixture stirred at refluxing temperature for about 15 hours after which a Liebig type condenser was substituted for the reflux condenser and the solvent removed by distillation. Heating was continued for a short time after distillation had substantially ceased and then live steam was introduced and after a thorough steaming out, the product was washed with water on a rubber mill or preferably on a mill having corrugated rolls or on other equipment adapted for washing tough plastic products. The washed product was dried to constant weight as for example by milling on a hot mill followed by heating in a vacuum oven. In this manner there was obtained substantially 180.5 parts by weight of a tough yellow rubbery product. This product was found to cure nicely in the presence of sulfur and accelerator and to be resistant to attack by solvents as for example gasoline and lubricating oil. For example a stock was made up as follows, the parts being by weight: 100 parts of the above plastic product, 40 parts Gastex, 10 parts zinc oxide, 5 parts whiting, 3 parts stearic acid, 2 parts pine tar, 2 parts sulfur and 1.5 parts mercaptobenzothiazole. This stock gave a good cure in 30 minutes at the temperature of forty pounds steam pressure per square inch. The cured product showed almost no swelling in lubricating oil after four days immersion at room temperature.

A rubber cement was prepared by dissolving substantially 100 parts by weight of pale crepe rubber in a suitable solvent as for example carbon bisulfide. To the cement so prepared contained in a suitable vessel fitted with a reflux condenser and stirrer there was added substantially 100 parts by weight of a crude tolyl dichlor phosphine. (This was the product obtained by reacting toluene with PCl₃ in the presence of anhydrous aluminum chloride as described in Liebig's Annalen vol. 212, pp. 206, 207, drawing off the upper layer which separated upon cooling and employing the lower layer as crude tolyl dichlor phosphine.) Heat was applied and after heating and stirring for about an hour, 100 parts by weight of technical retene was added and the heating and stirring continued for about twelve hours. A Liebig type condenser was then substituted for the reflux condenser and the solvent removed by distillation. Heating was continued for a short time after distillation had substantially ceased and live steam introduced. After a thorough steaming out the product was washed with water on a rubber mill or preferably on a mill having corrugated rolls or on other equipment adapted for washing tough plastic products. The washed product was dried to constant weight by milling on a hot mill followed by heating in a vacuum oven. Substantially 229 parts by weight of a tough brown rubbery product was obtained. It could be compounded very much like natural rubber and possessed useful properties not found in the later. For example, a vulcanizate prepared from a stock consisting of 100 parts by weight of the plastic, 10 parts zinc oxide, 0.5 part stearic acid and 1.5 parts mercaptobenzothiazole (all parts are by weight) was highly resistant to attack by ozone or solvents such as kerosene and benzene.

Substantially 100 parts by weight of ground truck peels were dispersed in a suitable solvent as for example toluene and substantially 80 parts by weight of crude tolyl dichlor phosphine added thereto. The charge was stirred and heated at about 55° C. for about two hours and substantially 80 parts by weight of technical retene added. Heating and stirring at 55° C. was continued for about 18 hours after which the solvent was removed, preferably by distillation. Heating was continued for a short time after distillation had substantially ceased and then live steam was introduced. After a thorough steaming out the charge was removed and washed with water on a rubber mill, preferably one having corrugated rolls, or on other equipment especially adapted for washing tough plastic products. The product was dried by milling on a hot mill followed by heating to constant weight in a vacuum oven. Substantially 202 parts by weight of tough rubbery product resistant to ozone and solvents was obtained. Since this product is referred to in specific compositions set forth to illustrate the invention it will, for convenience, be hereinafter designated as "scrap rubber derivative."

As set forth in the Beaver application referred to above it has been found that any reclaimed or scrap rubber is enormously improved with regard to resistance to solvents and ozone providing that the rubber is treated with technical dichlor phosphine equivalent to at least 60 parts by weight of the "crude" and at least 40 parts by weight of technical retene or retene oil per 100 parts by weight of the rubber. For best results the proportion of each reactant should be from 70 to 85 parts by weight, the optimum being about 80.

As specific embodiments of the invention illustrating the desirable properties of the new thermoplastic compositions and in nowise limiting the invention, stocks were compounded comprising the preferred admixtures together with compounding and vulcanizing ingredients. The composition of the stocks can best be described by reference to compounds of the individual plastics.

*Compound #1*

| | Parts by weight |
|---|---|
| Neoprene type G | 100.0 |
| Extra light calcined magnesia | 4.0 |
| Gastex | 28.8 |
| Phenyl β naphthylamine | 2.0 |
| Zinc oxide | 5.0 |

*Compound #2*

| | Parts by weight |
|---|---|
| Scrap rubber derivative | 100.0 |
| Zinc oxide | 10.0 |
| Sulfur | 5.0 |
| Mercaptobenzothiazole | 1.5 |
| Stearic acid | 3.0 |
| Pine tar | 2.0 |

The composition of the stocks as finally compounded was as follows:

|  | Stock | | |
| --- | --- | --- | --- |
|  | A | B | C |
|  | Parts by weight | Parts by weight | Parts by weight |
| Compound #1 | 100.0 | 88.0 | 82.0 |
| Compound #2 |  | 12.0 | 18.0 |

The stocks so compounded were cured by heating for different periods of time in a press at the temperature of 40 pounds of steam pressure per square inch. The modulus and tensile properties of the cured rubber products are set forth below:

Table I

| Stock | Cure time in mins. | Modulus of elasticity in lbs./in.² at elongations of— | | Tensile at break in lbs./in.² | Ult. elong., percent |
| --- | --- | --- | --- | --- | --- |
|  |  | 200% | 400% |  |  |
| A | 30 | 912 | 2,140 | 3,060 | 605 |
| B | 30 | 940 | 1,930 | 2,765 | 610 |
| C | 30 | 1,175 | 2,160 | 2,615 | 575 |
| A | 40 | 920 | 2,150 | 3,300 | 650 |
| B | 40 | 1,100 | 2,175 | 2,855 | 600 |
| C | 40 | 1,150 | 2,260 | 2,660 | 565 |

The above data show the superior modulus and tensile properties exhibited by the preferred admixtures.

Resistance to abrasion was determined by maintaining portions of the cured stocks in contact with an abrasive wheel and measuring the volume of stock worn away and the power consumed. A description of the apparatus and the method of carrying out the test may be found in A. S. T. M. Standards on Rubber Products, published by the American Society for Testing Materials, November 1937, pages 48–50, Method B.

| Stock | Cure time in mins. | Abrasion index |
| --- | --- | --- |
| A | 40 | 278 |
| B | 40 | 263 |
| C | 40 | 262 |

These results show that the volume of stock lost on abrading is less in the case of the preferred mixtures than with Neoprene alone. In addition, all of the stocks were found to be highly resistant to attack by ozone.

As further specific embodiments vulcanizable stocks were prepared which were essentially mixtures of Compound #2 and a third compound comprising:

*Compound #3*

| | Parts by weight |
| --- | --- |
| Hycar OR | 100.0 |
| Zinc oxide | 5.0 |
| Sulfur | 1.25 |
| Stearic acid | 1.0 |
| Dibutyl phthalate | 25.0 |
| Mineral acid rearranged 2,2,4-trimethyl dihydroquinoline | 2.0 |
| Cyclohexylamino thiobenzothiazole | 0.4 |
| Di(benzothiazyl thiol) dimethyl urea | 0.6 |
| Gastex | 60.0 |

The composition of the final stocks was as follows:

|  | Stock | | |
| --- | --- | --- | --- |
|  | D | E | F |
|  | Parts by weight | Parts by weight | Parts by weight |
| Compound #3 | 100.0 | 91.0 | 86.0 |
| Compound #2 |  | 9.0 | 14.0 |

The stocks so compounded were cured in a press by heating for different periods of time at the temperature of 60 pounds of steam pressure per square inch. The modulus and tensile properties of the cured products follow:

Table II

| Stock | Cure time in mins. | Modulus of elasticity in lbs./in.² at elongations of— | | Tensile at break in lbs./in.² | Ult. elong., percent |
| --- | --- | --- | --- | --- | --- |
|  |  | 200% | 400% |  |  |
| D | 30 | 855 | 1,735 | 2,195 | 535 |
| E | 30 | 1,060 | 2,000 | 2,230 | 505 |
| F | 30 | 1,235 |  | 1,930 | 350 |
| D | 40 | 902 | 1,780 | 2,160 | 520 |
| E | 40 | 1,100 | 2,050 | 2,050 | 400 |
| F | 40 | 1,350 |  | 2,135 | 390 |

These results further illustrate the superior physical properties of the new compositions.

The loss on abrasion was as follows:

| Stock | Cure time in mins. | Abrasion index |
| --- | --- | --- |
| D | 30 | 109 |
| E | 30 | 81 |
| F | 30 | 64 |
| D | 40 | 84 |
| E | 40 | 79 |
| F | 40 | 66 |

It is evident that the volume of stock worn away by the abrading wheel is progressively diminished as the Hycar is diluted by the second plastic component.

Further vulcanizable stocks were prepared which were essentially mixtures of Compound #2 and a fourth compound comprising

*Compound #4*

| | Parts by weight |
| --- | --- |
| Perbunan | 100.0 |
| Zinc oxide | 5.0 |
| Gastex | 45.0 |
| Stearic acid | 2.5 |
| Triphenyl phosphate | 2.0 |
| Sulfur | 1.0 |
| Mercaptobenzothiazole | 1.5 |

The complete stocks comprised:

|  | Stock | | |
| --- | --- | --- | --- |
|  | G | H | J |
|  | Parts by weight | Parts by weight | Parts by weight |
| Compound #4 | 100.0 | 90.0 | 84.0 |
| Compound #2 |  | 10.0 | 16.0 |

Since the preferred combinations of plastic materials possess increased plasticity over that of the separate ingredients, it was possible to compound the H and J stocks in a much shorter time than was required for the G stock. For example 5 minutes milling was required to produce a good sheet of Perbunan as against 1 minute in the case of an admixture of Perbunan with 25 percent of the plastic scrap rubber derivative. A total time of 21 minutes was required to prepare Stock G and only 12 minutes to prepare Stock J. It will of course be appreciated that it is unnecessary to compound the synthetic rubber and the rubber derivative separately. It is preferred to mix the plastic ingredients first followed by the addiiton of the compounding and vulcanizing ingredients. The aforementioned stocks were vulcanized by heating in a press at the temperature of 40 pounds of steam pressure per square inch and the modulus and tensile properties determined in known manner:

*Table III*

| Stock | Cure time in mins. | Modulus of elasticity in lbs./in.$^2$ at elongations of— | | Tensile at break in lbs./in.$^2$ | Ult. elong., percent |
|---|---|---|---|---|---|
| | | 200% | 400% | | |
| G | 35 | 475 | 1,425 | 1,885 | 505 |
| H | 35 | 805 | 1,960 | 1,960 | 400 |
| J | 35 | 1,060 | | 1,860 | 330 |
| G | 45 | 540 | 1,500 | 1,740 | 435 |
| H | 45 | 940 | 2,180 | 2,420 | 430 |
| J | 45 | 1,010 | | 1,825 | 330 |

These data further illustate the improved modulus and tensile exhibited by the new compositions.

The loss on abrasion was determined with the following results:

| Stock | Cure time in mins. | Abrasion index |
|---|---|---|
| G | 45 | 114 |
| H | 45 | 108 |
| J | 45 | 100 |

Combinations of Perbunan and the plastic prepared from ground truck peels are more resistant to abrasion than Perbunan alone.

While neoprene, Hycar and Perbunan are noted for their resistance to attack by oils and organic solvents, it has been found that their desirable properties in this respect are even further enhanced by combining them with the aforementioned oil resistant products prepared from rubber and aryl phosphine halides. It is possible to prepare combinations including natural rubber but while such combinations possess more resistance to oils and solvents than the rubber alone, the improvement is not significant. The presence of only a relatively small proportion of rubber results in considerable swelling of the stock. Furthermore, even with relatively high proportions of rubber the modulus and tensile properties are considerably below those of rubber alone. On the other hand admixture of a rubber-like polymer or co-polymer of a butadiene compound with an oil resistant product derived from a rubber and aryl phosphine halide results in a number of significant improvements. As amply shown by the foregoing data the modulus and tensile properties and the resistance to abrasion are materially enhanced. In order to show the superior resistance to attack by oils and solvents, samples of the above described stocks were immersed for 72 hours at room temperature in various organic liquids and the percent increase in weight after immersion noted. A minus figure indicates that there was a loss instead of a gain.

*Table IV*

| Stock | Cure | Percent increase in weight after immersion at room temperature in— | | |
|---|---|---|---|---|
| | | Gasoline | Benzene | Lubricating oil |
| A | 40 | 30.8 | 152.0 | 0.5 |
| B | 40 | 26.3 | 138.0 | −0.3 |
| C | 40 | 23.7 | 118.0 | −0.8 |
| D | 40 | 1.0 | 49.3 | −1.6 |
| E | 40 | 1.0 | 45.3 | −1.3 |
| F | 40 | 1.0 | 44.1 | −1.4 |
| G | 40 | 18.0 | 192.0 | 0.0 |
| H | 40 | 14.6 | 138.0 | −0.8 |
| J | 40 | 13.1 | 121.0 | −1.4 |

These results show that the resistance to oils and solvents of oil resistant synthetic rubbers is further enhanced by admixture with an oil resistant product prepared by treating a rubber with an aryl phosphine halide.

As further specific embodiments of the invention stocks were compounded comprising:

| | Stock | | | |
|---|---|---|---|---|
| | K | L | M | N |
| | Parts by weight | Parts by weight | Parts by weight | Parts by weight |
| Hycar | 20 | 30 | 40 | 50 |
| Scrap rubber derivative | 80 | 70 | 60 | 50 |
| Stearic acid | 1 | 1 | 1 | 1 |
| Sulfur | 3 | 3 | 3 | 3 |
| Zinc oxide | 5 | 5 | 5 | 5 |
| Di (benzothiazyl thiol) dimethyl urea | 1 | 1 | 1 | 1 |
| Diphenyl guanidine | 0.5 | 0.5 | 0.5 | 0.5 |
| Mineral acid rearranged 2, 2, 4-trimethyl dihydroquinoline | 2.0 | 2.0 | 2.0 | 2.0 |
| Gastex | 30 | 30 | 30 | 30 |

The stocks so compounded were vulcanized by heating for different periods of time in a press at the temperature of 40 pounds of steam pressure per square inch. The tensile strengths and the ultimate elongation of the cured rubber products are given in the following table:

*Table V*

| Stock | Cure time in mins. | Tensile at break in lbs./in.$^2$ | Ultimate elongation, percent |
|---|---|---|---|
| K | 15 | 1,340 | 140 |
| L | 15 | 1,840 | 205 |
| M | 15 | 2,200 | 290 |
| N | 15 | 2,560 | 340 |
| K | 25 | 1,450 | 180 |
| L | 25 | 2,080 | 195 |
| M | 25 | 2,340 | 260 |
| N | 25 | 2,555 | 280 |
| K | 35 | 1,490 | 120 |
| L | 35 | 2,020 | 175 |
| M | 35 | 2,640 | 205 |
| N | 35 | 2,610 | 260 |

The above data show that compositions of improved physical properties are obtained by increasing the proportion of Hycar up to a proportion of equal to that of the plastic derived from ground truck peels. Stocks K, L, M and N when considered with Stocks D, E and F show that the physical properties of each plastic are improved by combination up to approximately equal proportions of each.

The plasticity of the unvulcanized stocks was measured by means of an extrusion plastometer. See J. H. Dillon, Rubber Chemistry and Technology, vol. 9, pages 496–501 (1936) for a description of the method and apparatus used. The quantity measured is the time in seconds required to extrude a given volume of the stock at constant temperature and under a constant pressure. In this particular instance twelve pounds of air pressure and a temperature of 180° F. was used.

| Stock | Seconds |
|---|---|
| K | 32 |
| L | 14.5 |
| M | 11.5 |
| N | 13 |

These results show that the new compositions possess highly desirable plastic properties. That is to say, the admixtures of this invention possess less resistance to flow than the individual plastic components and normal compounding of stocks according to this invention produces compositions which can be readily handled and processed.

Again, this invention is not limited to the specific examples and compositions set forth to illustrate the invention. Other fillers, compounding and vulcanizing ingredients than those particularly mentioned may be utilized. Furthermore, the new plastic admixtures of this invention can be admixed with other gums or resins whether of natural or synthetic origin. This invention is limited solely by the claims attached hereto as part of the present specification.

What is claimed is:

1. A new plastic composition comprising an admixture of a rubber-like polymer selected from the group consisting of polymers of butadiene-1,3, polymers of 2-chlor butadiene-1,3, copolymers of butadiene-1,3 and styrene and copolymers of butadiene-1,3 and acrylic nitrile and a rubber-like vulcanizable oil resistant plastic obtained by heating a rubber with about an equal quantity of a crude aryl phosphine halide the halogen being attached to the phosphorus atom.

2. A new plastic composition comprising an admixture of a rubber-like polymer selected from the group consisting of polymers of butadiene-1,3, polymers of 2-chlor butadiene-1,3, copolymers of butadiene-1,3 and styrene and copolymers of butadiene-1,3 and acrylic nitrile and a rubber-like vulcanizable oil resistant plastic obtained by heating a rubber with 60–100 percent by weight on the rubber of a crude aryl phosphine halide the halogen being attached to the phosphorus atom in the presence of an aromatic polynuclear hydrocarbon in 40–100 percent by weight on the rubber.

3. A new plastic composition comprising an admixture of a rubber-like polymer selected from the group consisting of polymers of butadiene-1,3, polymers of 2-chlor butadiene-1,3, copolymers of butadiene-1,3 and styrene and copolymers of butadiene-1,3 and acrylic nitrile and a rubber-like vulcanizable oil resistant plastic obtained by heating a rubber with 60–100 percent by weight on the rubber of a crude aryl dichlor phosphine the two chlorine atoms being attached to the phosphorus atom in the presence of retene in 40–100 percent by weight on the rubber.

4. A new plastic composition comprising an admixture of a rubber-like polymer selected from the group consisting of polymers of butadiene-1,3, polymers of 2-chlor butadiene-1,3, copolymers of butadiene-1,3 and styrene and copolymers of butadiene-1,3 and acrylic nitrile and a rubber-like vulcanizable oil resistant plastic obtained by heating India rubber with about an equal quantity of a crude aryl dichlor phosphine the two chlorine atoms being attached to the phosphorus atom.

5. A new plastic composition comprising an admixture of a rubber-like polymer selected from the group consisting of polymers of butadiene-1,3, polymers of 2-chlor butadiene-1,3, copolymers of butadiene-1,3 and styrene and copolymers of butadiene-1,3 and acrylic nitrile and a rubber-like vulcanizable oil resistant plastic obtained by heating scrap rubber with 70–85 percent by weight on the rubber of a crude aryl dichlor phosphine the two chlorine atoms being attached to the phosphorus atom in the presence of retene in 70–85 percent by weight on the rubber.

6. A new plastic composition comprising an admixture of a rubber-like co-polymer of butadiene and acrylic nitrile and a rubber-like vulcanizable oil resistant plastic obtained by heating a rubber with about an equal quantity of a crude aryl dichlor phosphine the two chlorine atoms being attached to the phosphorus atom.

7. A new plastic composition comprising an admixture of a rubber-like co-polymer of butadiene and acrylic nitrile and a rubber-like vulcanizable oil resistant plastic obtained by heating a rubber with 60–100 percent by weight on the rubber of a crude aryl dichlor phosphine the two chlorine atoms being attached to the phosphorus atom in the presence of retene in 40–100 percent by weight on the rubber.

8. A new plastic composition comprising an admixture of a rubber-like co-polymer of butadiene and acrylic nitrile and a rubber-like vulcanizable oil resistant plastic obtained by treating India rubber with about an equal quantity of a crude aryl dichlor phosphine the two chlorine atoms being attached to the phosphorus atom.

9. A new plastic composition comprising an admixture of a rubber-like co-polymer of butadiene and acrylic nitrile and a rubber-like vulcanizable oil resistant plastic obtained by heating scrap rubber with about an equal quantity of a crude aryl dichlor phosphine the two chlorine atoms being attached to the phosphorus atom.

10. An admixture of a rubber-like polymer of chlorbutadiene and a rubber-like vulcanizable oil resistant plastic obtained by heating a rubber with about an equal proportion by weight of a crude aryl dichlor phosphine the two chlorine atoms being attached to the phosphorus atom in the presence of about an equal proportion by weight of retene.

11. A new plastic composition comprising an admixture of a rubber-like co-polymer of butadiene and acrylic nitrile and a rubber-like, vulcanizable oil resistant plastic obtained by heating scrap rubber with 70–85 percent by weight on the rubber of crude tolyl dichlor phosphine and technical retene in 70–85 percent by weight on the rubber.

12. A new plastic composition comprising an admixture of a rubber-like polymer of chlor butadiene and a rubber-like, vulcanizable oil resistant plastic obtained by heating scrap rubber with 70–85 percent by weight on the rubber of crude tolyl dichlor phosphine and technical retene in 70–85 percent by weight on the rubber.

13. A new plastic composition comprising an admixture of a rubber-like polymer selected from the group consisting of polymers of butadiene-1,3, polymers of 2-chlor butadiene-1,3, copolymers of butadiene-1,3 and styrene and copolymers of butadiene-1,3 and acrylic nitrile and a rubber-like vulcanizable oil resistant plastic obtained by heating a rubber with 60–200 parts by weight per 100 parts of the rubber of a crude aryl phosphine halide the halogen being attached to the phosphorus atom.

PAUL M. DOWNEY.